United States Patent [19]
Witt et al.

[11] 3,867,306
[45] Feb. 18, 1975

[54] OLEFIN POLYMERIZATION COMPOSITION

[75] Inventors: Donald R. Witt; Benny E. Nasser, both of Bartlesville, Okla.

[73] Assignee: Philips Petroleum Company, Bartlesville, Okla.

[22] Filed: Sept. 17, 1973

[21] Appl. No.: 398,081

Related U.S. Application Data

[63] Continuation of Ser. No. 237,880, March 24, 1972, abandoned.

[52] U.S. Cl................. 252/452, 252/451, 252/458
[51] Int. Cl...... B01j 11/34, B01j 11/06, B01j 11/32
[58] Field of Search.................... 252/451, 458, 452

[56] References Cited
UNITED STATES PATENTS

| | | | |
|---|---|---|---|
| 2,429,319 | 10/1947 | Kearby | 252/451 X |
| 2,478,519 | 8/1949 | Ashley et al. | 252/451 |
| 2,978,298 | 4/1961 | Wetzel et al. | 252/451 X |
| 3,622,521 | 11/1971 | Hogan et al. | 252/458 X |

*Primary Examiner*—C. Dees

[57] ABSTRACT

A chromium-containing xerogel, suitable for employment in a composition comprising a polymerization catalyst, is produced by incorporating the chromium in the hydrogel and separating water therefrom.

8 Claims, No Drawings

OLEFIN POLYMERIZATION COMPOSITION

This is a continuation of copending application Ser. No. 237,880 filed Mar. 24, 1972 now abandoned.

This invention relates to olefin polymerization catalyst.

In one of its more specific aspects, this invention relates to the preparation of a novel olefin polymerization catalyst and catalyst support and to their uses in the polymerization of olefins to produce polymers.

The process for polymerization of olefins such as ethylene and propylene by contact with a chromium-containing catalyst is well known from such patents as U.S. Pat. No. 2,825,721 to Hogan et al. and Canadian Pat. No. 853,414, both of which disclosures are incorporated herein by reference.

In general, the process involves contacting the olefin under olefin polymerization conditions with a catalyst comprising chromium on a support. If desired, the catalyst can contain adjuvants, such as titanium, which affect the properties of the polymers concerned. In the latter instance, the catalyst can be prepared by that method set forth in U.S. Pat. No. 3,622,521 to Hogan et al., that disclosure also being incorporated herein by reference.

As disclosed in the latter patent, the chromium can be deposited on the support by combination from aqueous or nonaqueous solutions and the titanium can be deposited on the support by combination in the substantial absence of water. It has now been determined that the catalyst can be prepared by other methods which affect the nature of the polymer product.

According to this invention there is provided a method for the production of a support suitable for employment in a composition comprising an olefin polymerization catalyst which comprises mixing an alkali metal silicate and an acid to produce a hydrogel, introducing a solution comprising a chromium compound into contact with the hydrogel and removing water from the chromium-containing hydrogel and to form a chromium-containing xerogel suitable as a polymerization catalyst, the chromium being in a form convertible to the hexavalent state upon activation of the composition.

In one aspect of this invention, some portion of the chromium compound is present in one of the reagents, that is, in the alkali metal silicate or in the acid, employed to produce the hydrogel.

The method of this invention involves the procedure in which an alkali metal silicate is added to an acid to produce a hydrogel; the hydrogel is aged and washed to produce a substantially alkali metal-free hydrous gel, and water is removed from the hydrous gel to produce a xerogel. The xerogel is impregnated with chromium and, if desired, adjuvants. The impregnated support is then activated by prior art methods to convert the chromium to its hexavalent state and to produce a catalyst active for olefin polymerization, the olefin polymerization being conducted according to prior art methods.

In the method of this invention, the alkali metal silicate is introduced into the acid, in contrast to introducing the acid into the silicate. To the volume of acid which is employed, the silicate is added in any suitable manner while suitably agitating the mixture to facilitate the reaction between the silicate and the acid. The alkali metal silicate is preferably introduced into the acid at a controlled rate. The silicate is added at such a rate that, on the average, from about 0.1 to about 15 weight percent of the total weight of sodium silicate to be added to the acid is added per minute of addition time. By addition time is meant the total period over which the addition is made, whether such addition is continuous or intermittent. For example, the bulk of the silicate can be added rapidly with the remainder of the silicate being added slowly, as long as the average rate of silica addition is met. In this step, either the acid or the silicate solution can contain a chromium-containing compound or a compound containing an adjuvant, such as titanium.

After gelling, the mixture is aged; this can be carried out at temperatures within the range of about 65°F. to about 200°F. Generally, aging times greater than one hour are used. The chromium can be added to the hydrogel prior to aging, at any point during the aging period or at the completion of the aging period.

Following aging, the gel is agitated to produce a slurry which is washed with either water, an ammonium salt solution or with dilute acid to reduce the alkali metal content of the gel to less than about 0.1 weight percent. While various ammonium salts and dilute acid solutions can be employed, the preferred salts are those such as ammonium nitrate and ammonium salts of organic acids which decompose and volatilize upon subsequent calcination. Water is then removed from the hydrogel.

Preferably, the water is removed from the chromium-containing hydrogel by contacting the hydrogel with an oxygen-containing, organic, water-soluble compound. Azeotropic distillation can be employed to separate the water and the organic compound from the hydrogel. If desired, the water can be removed by washing the gel with the liquid oxygen-containing compound. The remaining water, if any, and the oxygen-containing compound are then removed by drying under suitable conditions to form the xerogel.

The method of the present invention involves the foregoing steps modified in respect to the procedure by which at least a part of the chromium is incorporated into the support. The present invention incorporates at least a portion of the total chromium into the hydrogel by introducing into contact with the hydrogel, a chromium compound, at least a portion of the chromium being convertible to the hexavalent state during the subsequent activation.

The chromium is introduced into the hydrogel in any suitable manner. For example, it can be introduced into the hydrogel, at any time after the formation of the hydrogel, in the form of an aqueous chromium solution. If introduced in the form of an aqueous chromium solution, it is preferably introduced after the hydrogel has been aged and washed and contacted with the organic compound preparatory to water removal.

Alternately, the chromium compound can be introduced in the form of a nonaqueous chromium solution, the solvent comprising the organic, oxygen-containing compound which is also employed to remove the water from the hydrogel.

Alternately, the chromium compound can be introduced as a solid or a liquid, being introduced either directly into contact with the hydrogel or into a mixture of the hydrogel comprising water and/or the organic oxygen-containing compound.

Any portion of the ultimate chromium content of the catalyst can be so introduced into the hydrogel, the ultimate chromium content of the activated catalyst preferably being within the range of from about 0.1 to about 10 weight percent. Relatedly, a portion of the ultimate chromium content can be introduced by incorporation into the alkali-metal silicate or by incorporation into the acid, or both, before mixing. If desired, a portion of the chromium can be incorporated into the xerogel subsequent to its recovery.

The chromium compound can be introduced into contact with the hydrogel in such concentration that the initial concentration of the chromium is reduced by the subsequent processing steps, i.e., washing, etc., to the desired value. Similarly, the chromium compound can be introduced into contact with the hydrogel in a plurality of steps, either before or after the production of the washed hydrogel but prior to the separation of water therefrom. Preferably, the chromium compound is introduced into the hydrogel after it has been washed substantially free of the alkali metal, the introduction being carried out in a single step which incorporates into the hydrogel the desired quantity of the chromium compound from an aqueous solution.

The chromium compound can be introduced into contact by mixing or slurrying the gel in the chromium solution. Preferably, the chromium compound is introduced into the gel with a minimum of agitation. Any of the conventionally employed chromium compounds can be used for incorporation. These compounds include chromium trioxide, chromium sulfate, chromium acetate, t-butyl chromate, and the like.

In summary, either the alkali or the acid can contain either a chromium-containing compound or a compound of an adjuvant, or both. The chromium-containing compound can be added to the hydrogel at any time after its formation, prior to the conversion of the hydrogel to the xerogel. Either an adjuvant-containing compound or a chromium-containing compound, or both, can be added to the xerogel after its recovery.

The method of this invention is exemplified in the following runs which are directed in the general principles involved in the invention and are not meant to limit the invention thereto.

EXAMPLE I

A catalyst was prepared by introducing a solution of sodium silicate into a solution of sulfuric acid containing a titanium compound to form a hydrogel. The hydrogel was washed substantially free of sodium ions with ammonium nitrate solution. The washed hydrogel was contacted with ethyl acetate, employing azeotropic distillation to produce the xerogel. The xerogel was impregnated with an aqueous solution of chromium trioxide, dried and the chromium-impregnated, titanium-containing silica was activated to produce a catalyst containing about 2.5 weight percent titanium and about 1 weight percent chromium. This preparation did not employ the method of this invention.

EXAMPLE II

The method of this invention was employed to produce a catalyst. The procedure of Example I was employed to produce the washed hydrogel. The washed hydrogel was then contacted with an aqueous solution of chromium trioxide. The chromium-containing hydrogel was then contacted with ethyl acetate to produce the xerogel according to the procedures of Example I. The xerogel was then activated to produce a catalyst containing about 2.5 weight percent titanium and about 1 weight percent chromium.

The above catalysts, having been prepared under substantially identical conditions except in that aspect pertinent to the invention, were individually employed in the polymerization of ethylene at about 230°F. in the particle-form process under substantially identical conditions with the following results:

| Catalyst | Polymer Yield, g/g | Polymer Melt Index |
|---|---|---|
| I | 4910 | 0.54 |
| II | 5000 | 5.5 |

The above data indicate that the method of this invention produces a catalyst which is operable to produce a polymer of superior melt index.

In carrying out the method of this invention, it is preferable that the silicon dioxide content of the hydrogel be within the range of from about 5 to about 12 weight percent, and that gelations be effected at a temperature within the range of 32 to about 158°F., at a pH of about 3 to about 8.

Preferably, the hydrogel is aged for at least two hours at a temperature within the range of from about 77° to about 212°F.

The invention can be carried out employing such organic compounds as ethyl acetate, acetone, and the like for dehydration of the hydrogel.

The catalyst activation is preferably carried out by activating the catalyst at a temperature of about 1,600°F. for a period of about five hours.

The catalyst is particularly suitable for polymerization of ethylene at about 230°F. and in general at polymerization temperatures up to about 500°F. as stated in the disclosure of the previously-mentioned U.S. Pat. No. 3,622,521.

The method of this invention can be employed as the sole means of impregnating the support with chromium or in combination with other procedures for impregnating the support with either chromium or an adjuvant, either previous to, or/and after the application of the method of this invention.

It will be seen from the foregoing that various modifications can be made to the method of this invention. Such modifications are considered, however, to be within the scope of the invention.

What is claimed is:

1. A method of preparing a chromium-containing silica composition comprising:
    a. adding an alkali metal silicate to an acid to form a hydrogel;
    b. aging the hydrogel for greater than one hour;
    c. washing the aged hydrogel to produce a substantially alkali metal-free hydrogel;
    d. incorporating an aqueous solution of said chromium-containing compound into said thus washed hydrogel;
    e. forming a mixture comprising said washed hydrogel and a normally liquid, oxygen-containing, water-soluble organic compound capable of aiding in removing water;
    f. thereafter separating said organic compound and said water from said mixture to form a xerogel; and
    g. recovering said xerogel as said chromium-containing silica composition.

2. A method according to claim 1 wherein said chromium is in or is convertible to the hexavalent state upon addition to said hydrogel.

3. A method according to claim 1 wherein said chromium-containing compound is chromium trioxide.

4. A method according to claim 1 wherein said water-soluble organic compound is ethyl acetate.

5. A method according to claim 1 wherein said acid contains a titanium compound.

6. A method according to claim 1 wherein said water-soluble organic compound is ethyl acetate and said chromium-containing compound is chromium trioxide.

7. A method according to claim 6 wherein said acid is sulfuric acid.

8. A method according to claim 7 wherein said acid contains a titanium compound.

* * * * *